UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

SULFURIZED DYES AND PROCESS OF MAKING SAME.

1,098,260.  Specification of Letters Patent.  Patented May 26, 1914.

No Drawing.  Application filed October 16, 1912.  Serial No. 726,123.

*To all whom it may concern:*

Be it known that I, HEINRICH HEIMANN, a citizen of the German Empire, residing at Dessau, Germany, my post-office address being Friedrich-Schneider strasse 63, Dessau, Germany, have invented new and useful Improvements in Sulfurized Dyes and Processes of Making Same, of which the following is a specification.

In my copending application Serial No. 726,121 I describe and claim generally new sulfurized dyes fast to washing and to chlorin which may be obtained by acting with a sulfurizing agent upon a 4-hydroxy-diarylamin in which only the 4-hydroxyaryl group is capable of assuming the paraquinoid form.

Now in my present application I claim a special class of these new dyes which derive from those of such 4-hydroxy-diarylamin in which the 4'-position is occupied by an alkoxy group or from their derivatives in which the two benzene-nuclei contain further univalent substituents such as a halogen, an alkyl or alkoxy group, a carboxylic group, etc., the sulfonic group being excepted.

In producing the new sulfur dyes according to this invention I may also use as parent material the corresponding thio compounds, *i. e.* the corresponding derivatives of thiodiphenylamin; thus for instance instead of 4-hydroxy-4'-methoxydiphenylamin I may employ the 4-hydroxy-4'-methoxythiodiphenylamin.

The following example may serve to illustrate my invention, the parts being by weight: 30 parts of 4-hydroxy-4'-methoxydiphenylamin are introduced into a solution prepared from 90 parts of crystallized sodium sulfid, 90 parts of water and 72 parts of sulfur. The mass is then boiled during about 24 hours at the reflux condenser, whereupon 45 parts of crystallized sodium sulfid dissolved in about 1500 parts of water are added. From the resulting mass the dye is isolated by introducing a current of air, filtering, washing and drying. The new dye thus obtained produces on cotton without a mordant in a bath containing an alkali sulfid red-brown tints with a blue cast which possess an excellent fastness to washing and are fast to chlorin.

The new dyes derived from a 4-hydroxy-4'-alkoxydiphenylamin represent in the dry state when pulverized dark brown powders which are very difficultly soluble in alcohol, glacial acetic acid, benzene and chlorobenzene; they are more or less difficultly soluble in nitrobenzene, anilin and pyridin. In concentrated sulfuric acid and in 25% fuming sulfuric acid they dissolve, generally speaking, to blue to violet solutions which remain unaltered on the addition of boric acid but are gradually decolorized on the addition of aluminium powder.

The new dyes are also capable of being dyed from a hydrosulfite vat giving, generally speaking, a yellow vat from which cotton is dyed, generally speaking, red-brown tints.

It is obvious to those skilled in the art that my invention is not limited to the foregoing example or to the details given therein. Thus for instance instead of 4-hydroxy-4'-methoxydiphenylamin the corresponding ethoxy derivative may be employed; furthermore the new dyes may also be prepared by heating the parent material with sulfur alone.

It may also be stated that the proportions of the ingredients as well as the temperature of reaction or the duration of heating may be altered within wide limits without departing from the scope of my present invention.

Having now described my invention and the manner in which it may be performed what I claim is—

1. The manufacture of new sulfurized dyes fast to washing and to chlorin by acting with a sulfurizing agent upon a 4-hydroxy-4'-alkoxydiphenylamin containing no sulfonic group and having the following nucleus:

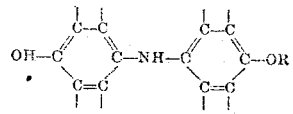

in which diagram R means an alkyl-group.

2. The manufacture of new sulfurized dyes fast to washing and to chlorin by acting with a polysulfid upon a 4-hydroxy-4'-alkoxydiphenylamin containing no sulfonic group and having the following nucleus:

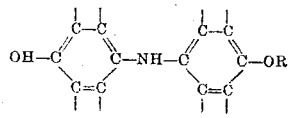

in which diagram R means an alkyl-group.

3. The manufacture of new sulfurized dyes fast to washing and to chlorin by acting with a polysulfid in the presence of a substance being a liquid at the temperatures prevailing during the reaction upon a 4-hydroxy-4'-alkoxydiphenylamin containing no sulfonic group and having the following nucleus:

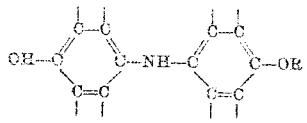

in which diagram R means an alkyl-group.

4. The manufacture of new sulfurized dyes, fast to washing and to chlorin, by acting with a sulfurizing agent upon 4-hydroxy-4'-methoxydiphenylamin.

5. The manufacture of a new sulfurized dye, fast to washing and to chlorin, by acting with a polysulfid upon 4-hydroxy-4'-methoxydiphenylamin.

6. The manufacture of a new sulfurized dye fast to washing and to chlorin by acting with a polysulfid in the presence of a suitable liquid upon 4-hydroxy-4'-methoxydiphenylamin.

7. As new articles of manufacture the new sulfurized dyes, fast to washing and to chlorin, derived from a 4-hydroxy-4'-alkoxydiphenylamin, which new dyes in the dry state when pulverized represent dark brown powders which are very difficultly soluble in alcohol, glacial acetic acid, benzene and chlorobenzene and which are more or less difficultly soluble in nitrobenzene, anilin and pyridin, these new dyes dissolving in concentrated sulfuric acid and 25% fuming sulfuric acid, generally speaking, to blue to violet solutions which remain unaltered on the addition of boric acid but are gradually decolorized on the addition of aluminium powder, and these new dyes producing on unmordanted cotton from a dye-bath containing an alkali-sulfid, generally speaking, red-brown tints, and which new dyes are also capable of being dyed from a hydrosulfite vat yielding, generally speaking, a yellow vat, from which cotton is dyed, generally speaking, red-brown tints.

8. As a new article of manufacture a new sulfurized dye which may be obtained by acting with a polysulfid upon 4-hydroxy-4'-methoxydiphenylamin which new dye in the dry state when pulverized is a dark red-brown powder, which is very difficultly soluble in alcohol, glacial acetic acid, benzene and chlorobenzene to a red to blue-red solution and which is soluble in nitrobenzene, anilin and pyridin to a blue-red solution, this new dye dissolving in concentrated sulfuric acid and in 25% fuming sulfuric acid to a blue solution which remains unaltered on the addition of boric acid but is gradually decolorized on the addition of aluminium powder, and which new dye produces on cotton from a dye-bath containing an alkali-sulfid red-brown tints with a blue cast which are very fast to washing and fast to chlorin, and which new dye is also capable of being dyed from a hydrosulfite vat yielding a yellow vat from which cotton is dyed red-brown with a blue cast.

In testimony whereof I have signed my name to this specification in the presence of two subscribing witnesses.

HEINRICH HEIMANN.

Witnesses:
 RUDOLPH FRICKE,
 DORIS KRAHL.